US006973032B1

(12) United States Patent
Casley et al.

(10) Patent No.: US 6,973,032 B1
(45) Date of Patent: Dec. 6, 2005

(54) SELECTIVE BACKPRESSURE CONTROL FOR MULTISTAGE SWITCHES

(75) Inventors: Ross T. Casley, Palo Alto, CA (US); John B. Levy, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 860 days.

(21) Appl. No.: 09/730,408

(22) Filed: Dec. 4, 2000

(51) Int. Cl.[7] ............................................. H04L 12/56
(52) U.S. Cl. ...................................... 370/230; 370/413
(58) Field of Search ............................... 370/230, 231, 370/232, 233, 234, 252, 253, 357, 359, 384, 370/386, 358, 389, 391, 412, 413

(56) References Cited

U.S. PATENT DOCUMENTS

| | | | | |
|---|---|---|---|---|
| 5,689,506 | A | * | 11/1997 | Chiussi et al. ............... 370/388 |
| 6,011,779 | A | * | 1/2000 | Wills ........................... 370/236 |
| 6,067,298 | A | * | 5/2000 | Shinohara .............. 370/395.71 |
| 6,134,218 | A | * | 10/2000 | Holden ........................ 370/232 |
| 6,151,301 | A | * | 11/2000 | Holden ........................ 370/232 |
| 6,438,107 | B1 | * | 8/2002 | Somiya et al. ............... 370/233 |

* cited by examiner

*Primary Examiner*—Melvin Marcelo
(74) *Attorney, Agent, or Firm*—Campbell Stephenson Ascolese LLP

(57) ABSTRACT

A method and apparatus for applying selective backpressure to control a multi-stage interconnection network (MIN). At one or more stages in the MIN, local information is used to define a queue status parameter for each local queue in the fabric. At the egress linecard, the upstream queue status parameter is periodically combined with the egress linecard's output queue status to generate a queue-specific backpressure signal. The backpressure signal continuously indicates to the ingress linecard that a specific fabric queue or queues is experiencing congestion and that the ingress linecard should therefore slow down or stop sending additional packets to the affected queue. Status computation mechanisms, which are state machines in one embodiment of the present invention, are incorporated in each switch element in at least the last stage of the switch fabric. In an alternate embodiment, the ingress linecard further combines the backpressure signal with its own local queue status to influence the initial queuing decision. In another alternate embodiment, queue status calculating mechanisms are present within one or more stages further upstream from the last stage of the switch fabric. Queue status information from many stages can thus be scaleably combined with egress queue status to determine fabric congestion conditions efficiently and accurately in all queues.

28 Claims, 12 Drawing Sheets

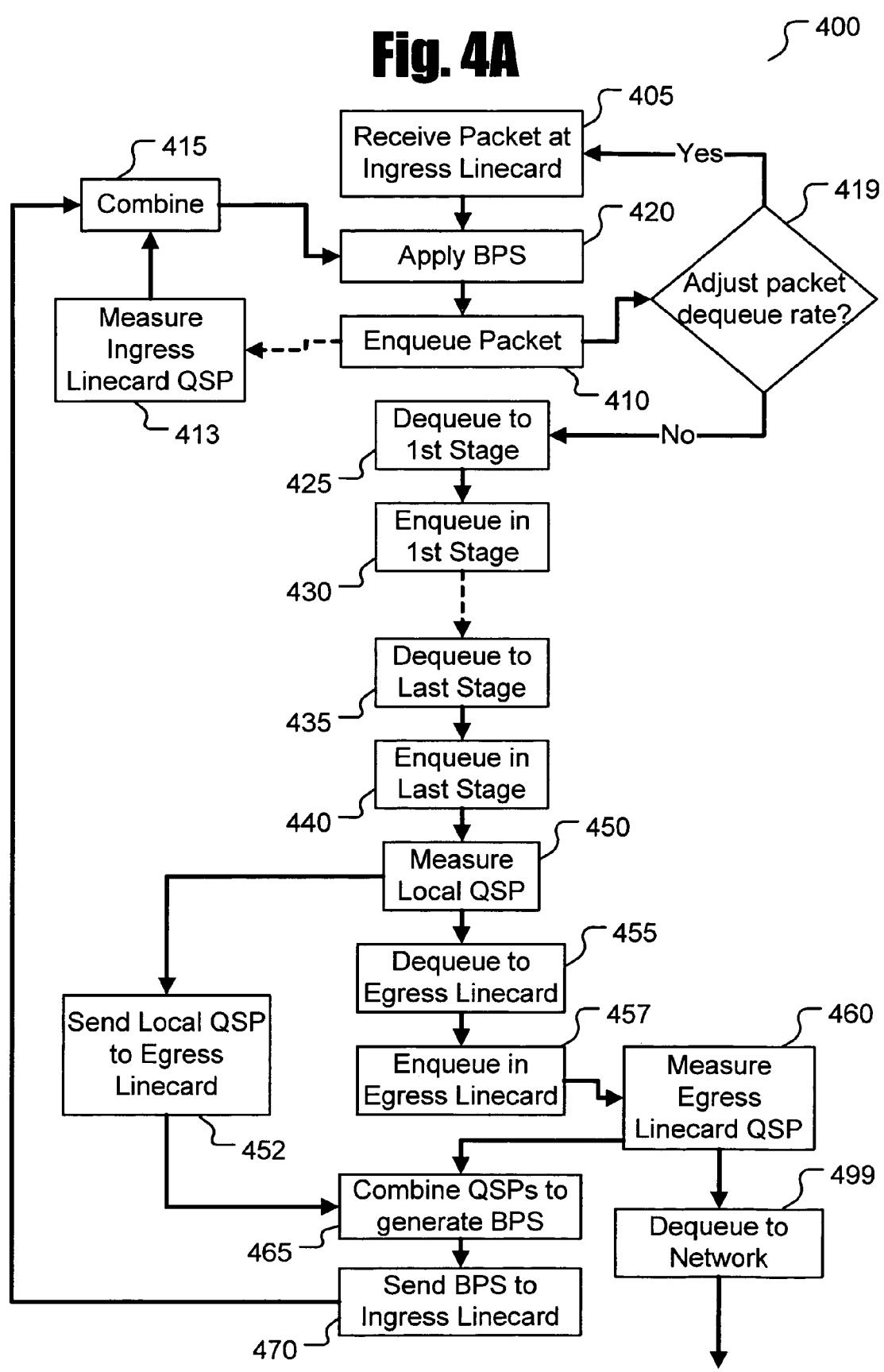

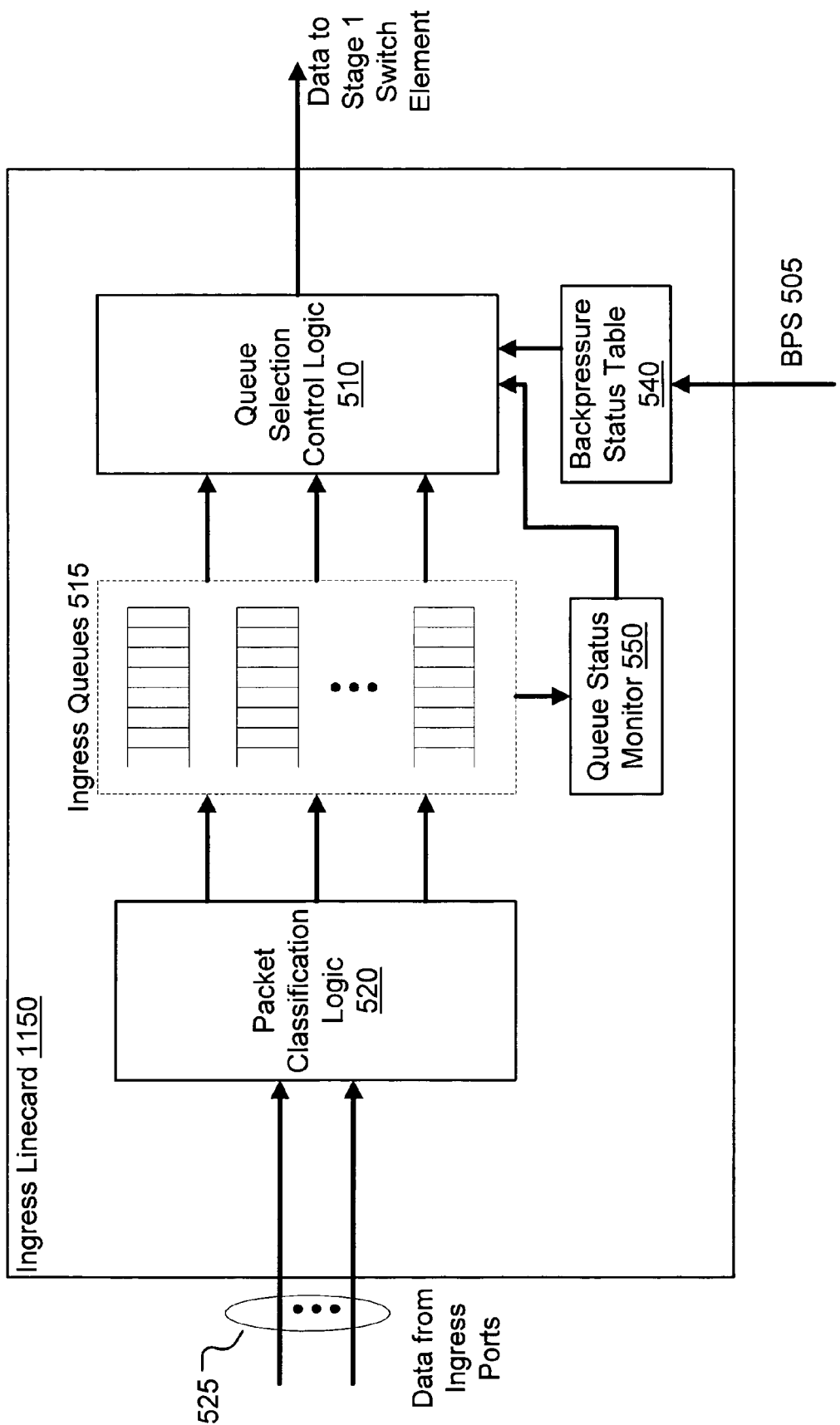

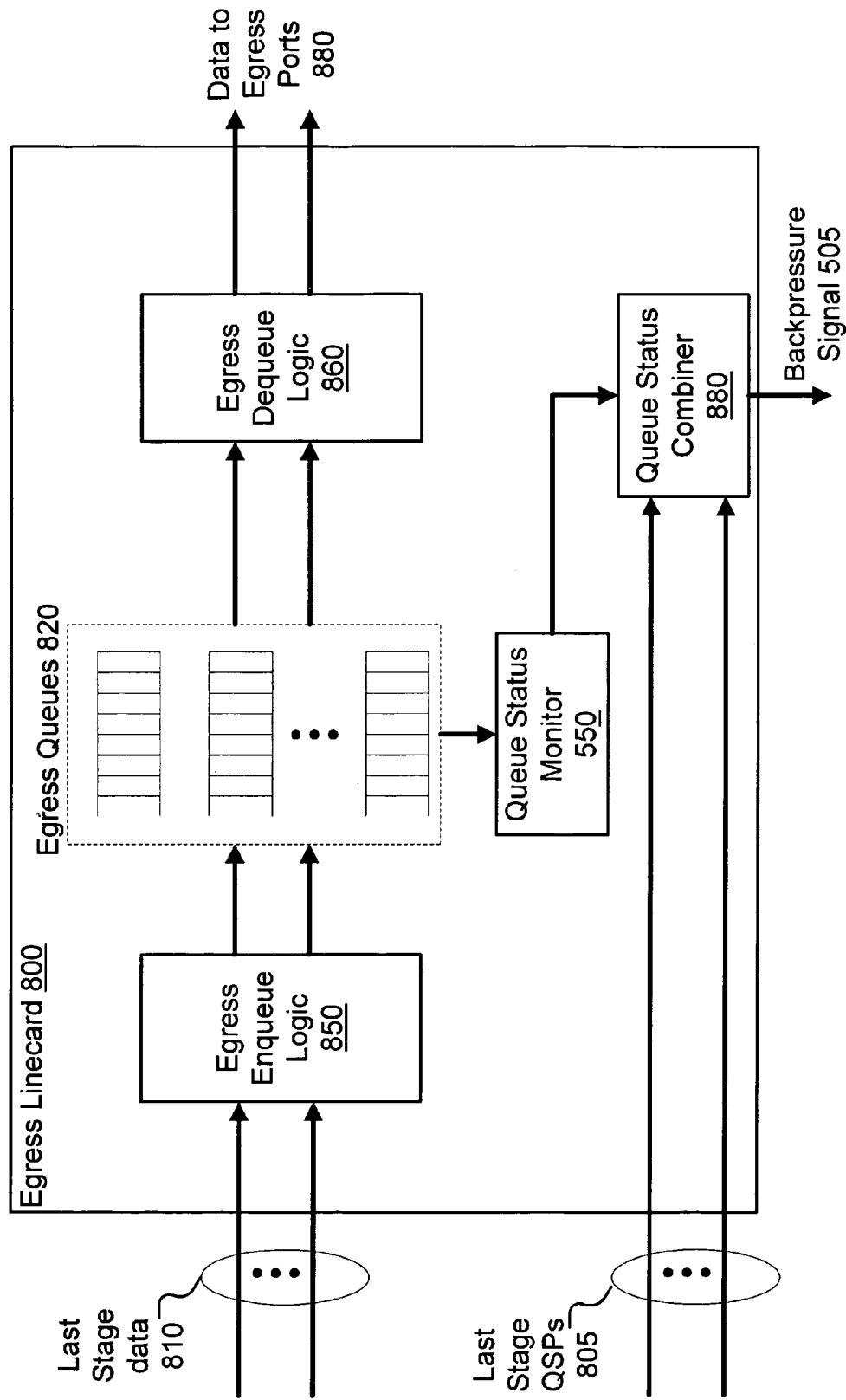

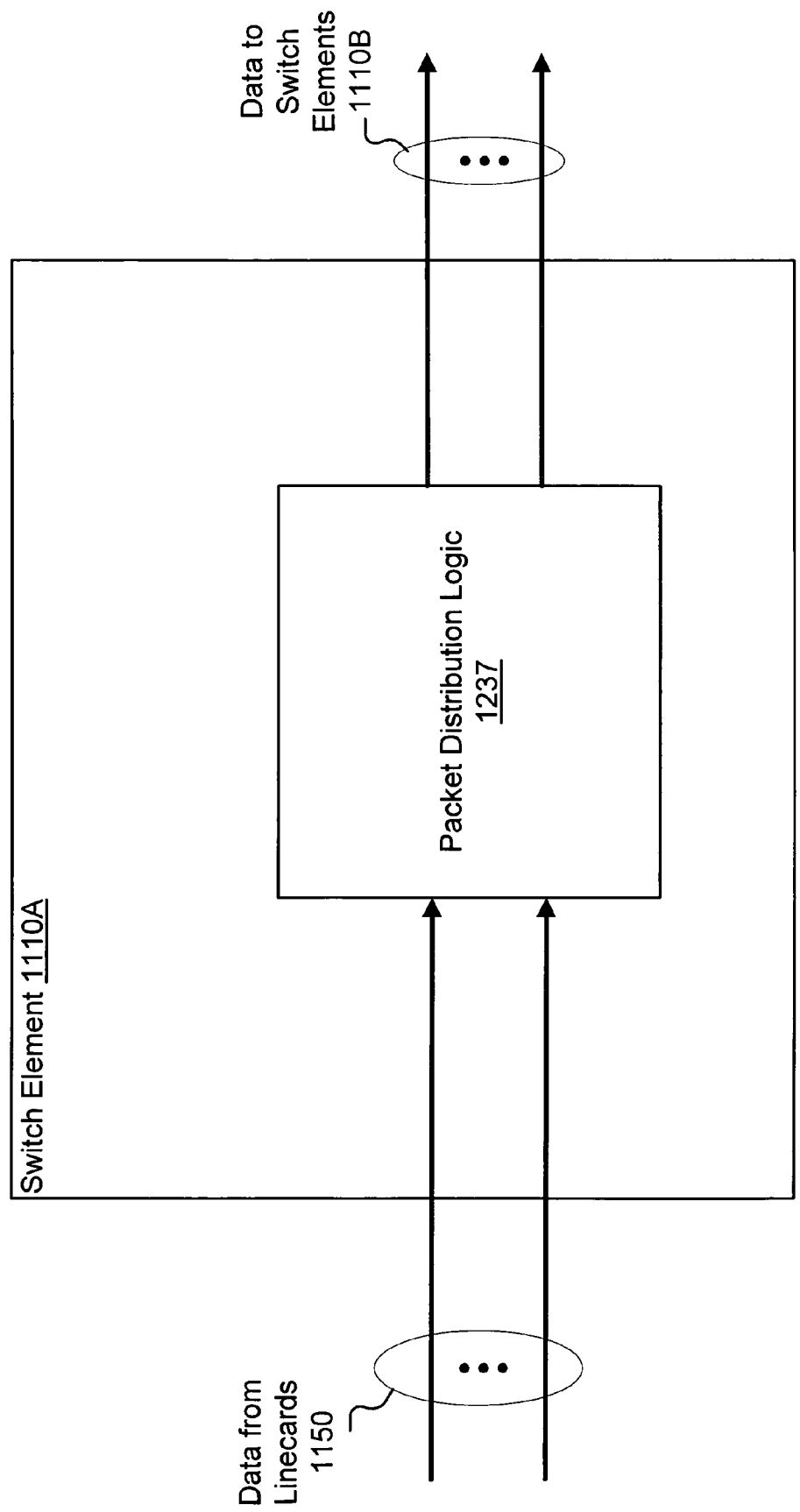

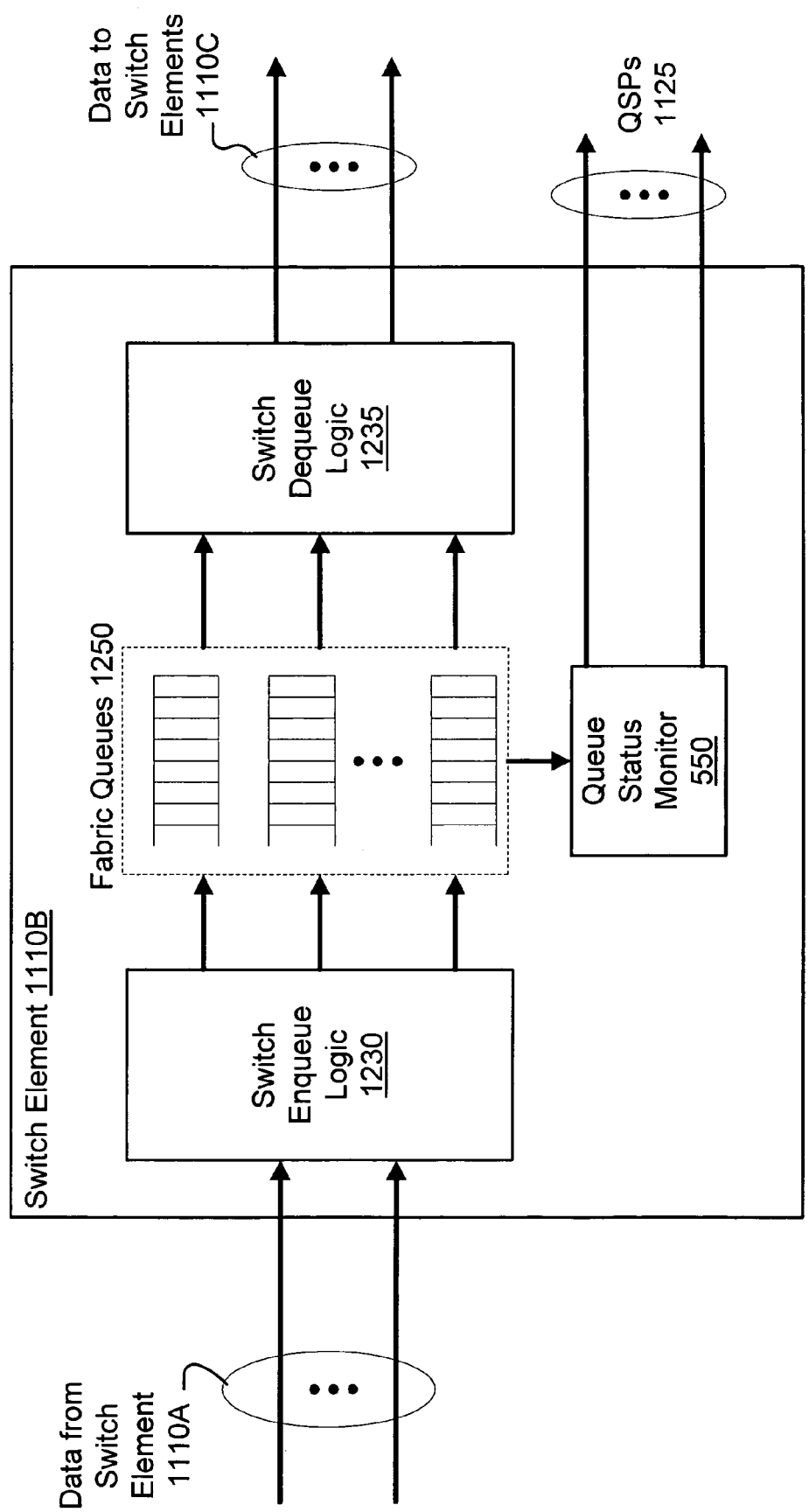

SELECTIVE BACKPRESSURE CONTROL FOR MULTISTAGE SWITCHES

BACKGROUND OF THE INVENTION

1. Field of the Invention

The present invention relates to computer network communication devices, in particular multi-element switches.

2. Description of the Related Art

Multi-element switching (or "switch") fabrics, also known as multistage interconnection networks (MINs) are well known in the art. See, for example, Jonathan Turner and Naoki Yamanaka, "Architecture Choices in Large Scale ATM Switches," IEICE Transactions 1998 (using the term "Buffered Multistage Switches" rather than the more common "MIN"), incorporated herein by reference in its entirety. MINs connect a set of independent ingress linecards (which receive data packets into the switch) to a set of egress linecards (which send switched packets out of the switch). The ingress and egress linecard functions may be implemented on the same physical circuit board or on two separate boards. Both types of linecard boards are well known in the art.

Referring to FIG. 1, the switch fabric consists of a number of switch elements (or nodes) 110, each of which has a set of local queues and switching logic (well known in the art) that redirects received data packets to the next switch element 110, or, if already in the last switch element, to an egress linecard 120. The switch fabric, together with the ingress 130 and egress 120 linecards are, in the aggregate, known simply as the switch, MIN 100.

Switch fabric 150 may have many stages 115A, 115B, ... through 115m. Each switching stage 115 may also be composed of several switch elements 110. Each stage makes a local switching decision based on all or part of the packet data. This architecture is known for being very flexible because packets from a number of ingress linecards 130A through 130n can be rapidly switched to egress linecards 120A through 120n.

Typical ingress linecards 130 have, among other elements, a set of input ports connected to a set of input queues. Packets from the input queues are sent over the switch fabric 150 and are thereby directed to the appropriate egress linecard 120. The egress linecard 120 contains a set of output queues that buffer packets leaving the switch.

Multi-element switch fabrics typically lack a deterministic scheduling mechanism. Data is simply flooded into the switch fabric from the ingress linecards 130. Under certain conditions, congestion may occur due to over-loading of an internal link between switch elements 110. Note that traffic bound for multiple output queues may be aggregated onto a single internal link, and that the overload may be due to only one of the separate traffic streams. This type of congestion is referred to as switch fabric congestion.

Some prior art systems have attempted to address such congestion by generating a backpressure signal that requests other components of the switch system to stop sending traffic that would traverse the congested link. If this backpressure signal does not distinguish between the various component traffic that is aggregated onto the congested link, then all traffic will suffer reduced throughput, even those traffic streams that are not causing the congestion.

To avoid such behavior, prior art systems have typically maintained multiple queues at each switch element 110 with a 1-to-1 correspondence to the output queues of the entire switch. However, as systems expand to support many queues at many linecards, the number of queues required at each switch element becomes too large to support.

What is needed is a scalable method and apparatus to control congestion within a switch fabric that supports very large numbers of linecards.

SUMMARY

Presently described is a method and apparatus for use in one or more stages of a multi-element switching fabric (such as a Benes network) that computes information on local stage queue status and forwards it downstream towards the egress linecards. At each subsequent stage receiving the information, upstream stage information is concatenated or otherwise combined with local stage information to update a queue status parameter for each local fabric queue. At the egress linecard, the upstream (i.e., last switch element) queue status parameter is periodically and asynchronously (with respect to subsequent packets) combined with the egress linecard output queue status information to generate a queue-specific backpressure signal. The backpressure signal then indicates to the ingress linecard that a specific fabric queue or queues is experiencing congestion and that the ingress linecard should slow down, buffer, or stop sending additional packets to the affected queue or queues. Status computation mechanisms, which are state machines in one embodiment of the present invention, are incorporated in each switch element in the last stage of the switch fabric; each computation mechanism sends its own queue status information to each egress linecard. Each egress linecard then periodically combines the upstream (last stage) fabric queue status information with the egress linecard's own queue status to generate a continuous backpressure signal for use by the ingress linecards.

The backpressure signal may take one of several states including zero (no) backpressure and full backpressure, i.e., "shut off the flow". The backpressure signal from the egress linecard is passed back to the ingress linecard through conventional communication channels present in all MIN, such as by in-band signaling through an upstream message path. The ingress linecard acts on the backpressure signal by shutting down or restricting packets going to the backpressured queues. In other words, the egress linecard determines for each of its queues which ones, if any, are in need of backpressure control to avoid congestion. The backpressure signal is communicated to the ingress linecard, which is the only part of the system that has the authority to regulate how many packets are sent into a particular egress queue.

Packets whose flow is to be restricted (according to the backpressure signal) may be simply dropped, or preferably buffered in the ingress linecard, until the backpressure signal indicates that fabric congestion in the affected queue or queues has cleared.

In an alternate embodiment, the ingress linecard may combine the information in the backpressure signal with the ingress linecard's own (local) queue status. Thus, the ingress linecard can make an even finer-grained determination of congestion control by factoring in its current queue status with the downstream fabric queue status from the switch element(s) and the egress linecard.

In a further alternate embodiment, queue status calculating mechanisms may be present within switch fabric elements located further upstream from the last stage of the switch fabric, i.e., multiple stages may have mechanisms to determine local queue status. This may extend to include every stage element of the switch fabric. In this way fabric queue status information from many stages can be scaleably combined with egress linecard queue status and used to determine, efficiently and accurately, congestion conditions in all queues within the switch fabric.

BRIEF DESCRIPTION OF THE DRAWINGS

The present disclosure may be better understood and its numerous features and advantages made apparent to those skilled in the art by referencing the accompanying drawings.

FIG. 4A is a flowchart of the selective backpressure control method according to one embodiment of the present invention.

FIG. 5 is a high-level schematic diagram of an ingress linecard 1150 according to some embodiments of the present invention.

FIG. 6 is a high-level schematic diagram of egress linecard 800, according to some embodiments of the present invention.

FIG. 9A is a high-level schematic of switch element 1110A according to one embodiment of the present invention.

FIG. 9B is a high-level schematic of switch element 1110B according to one embodiment of the present invention.

The use of the same reference symbols in different drawings indicates similar or identical items.

DETAILED DESCRIPTION

Introduction

Figure 1:
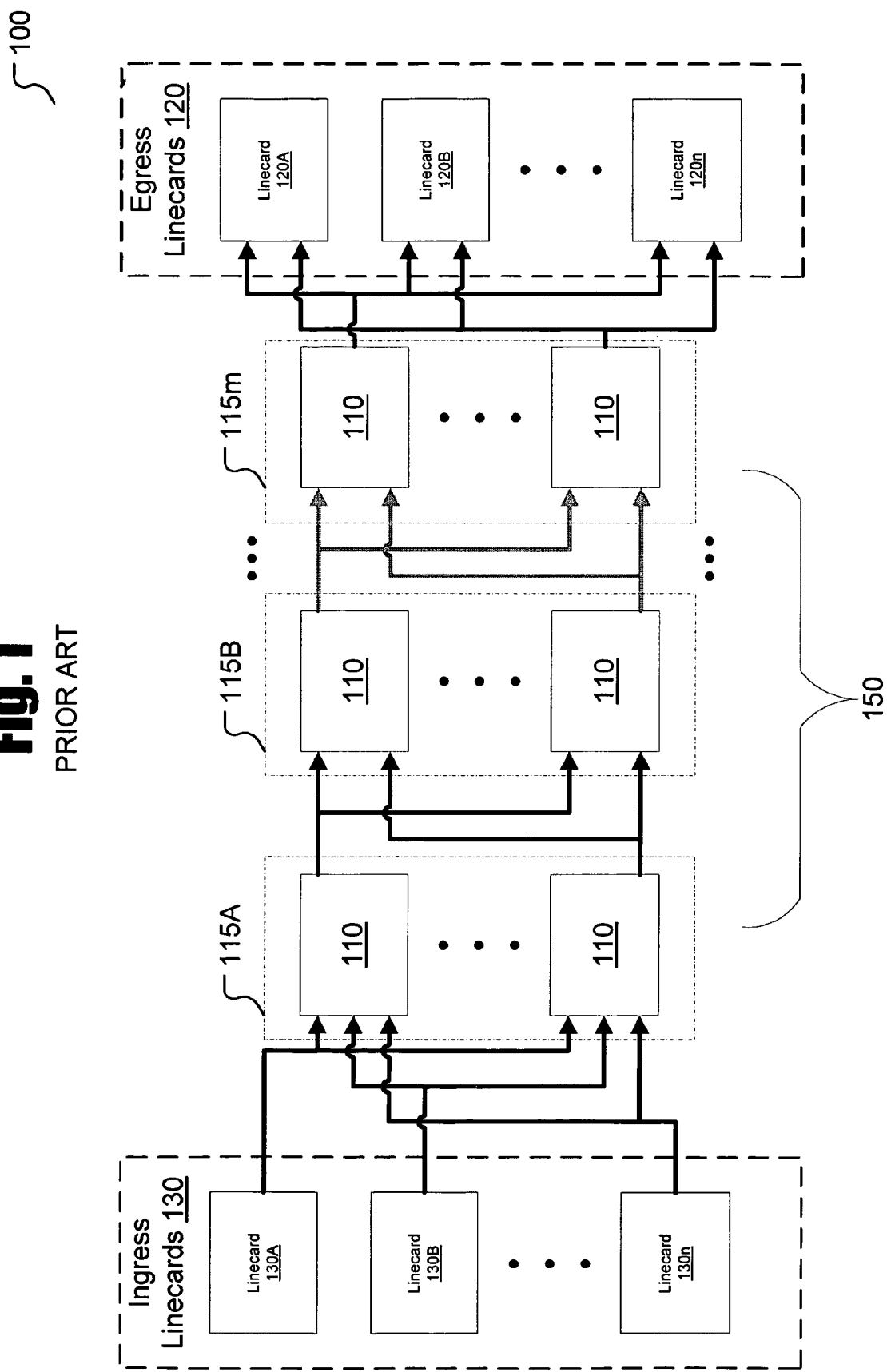
FIG. 1 is a high-level schematic of a prior art multi-element switching fabric.

In a multi-element switch fabric, also referred to as a multi-stage interconnection network (MIN), switching elements are configured into multiple stages wherein each stage has one or more switching elements. These stages, from the first stage to the last stage, provide switching functionality based on the contents of the data packet or some portion thereof. Typically, the first stage (as in, for example, a Benes network) performs a load balancing function by simply distributing packets (without monitoring or queuing them) among second stage elements without regard for packet destination address. Then, in the second stage, the highest order bits in the packet header (or perhaps the highest order bits in the destination port number, as one example) are read and used to determine the appropriate switch element in the next stage. This process continues down the hierarchy of stages to the last stage, at which the last switching decision determines to which egress linecard the packet is to be sent.

In one embodiment of the present invention, each switch element has only one queue for each of its output interfaces. That is, if a switch element is a two by two switch, i.e., having two inputs and two outputs, only two queues are present, one on each output. These queues (the "fabric queues") provide a modicum of buffering within the switch element. It is also known in the art to have more than two inputs and outputs on a switch element and therefore more than two output queues. Still, each fabric queue (corresponding to each output of the switch element) is subject to overloading, depending upon the number of packets arriving in each switch element in a given time period. Thus, the congestion monitoring and avoidance system of the present invention is employed over more than one fabric queue.

In an alternate embodiment, there are multiple output queues for each input queue, configured to handle more than one traffic priority queue on the output side (e.g. one priority per output queue). Other multiple output (fabric) queues are known in the art. The present invention is accordingly not limited to the multiple-priority output queue scheme here noted, but rather encompasses all multiple output queue schemes or architectures known in the art.

In the present invention, the last stage of a MIN contains circuitry to determine and read out the status of each of its own queues. This queue status parameter (QSP) is then passed to the egress linecard along with the data packet. The egress linecard uses the queue status parameter and its own local information on the queue to which the switched packet is destined to determine the loading condition of that egress queue. The egress linecard periodically generates a backpressure signal (BPS), if appropriate, to indicate to the ingress linecard that the designated queue is already overfilled or is becoming overfilled, i.e., congested.

Representative Embodiment

Ingress linecards 130 (referring back to FIG. 1 momentarily), collectively consist of one or more physical linecards. These linecards, as are well known in the art, consist of one or more ports connected to a network and conventional packet parsing, classification logic, and buffering circuits. Each linecard typically also includes a queuing structure whereby packets are stored or buffered for sequential transmission out of the linecard into the rest of the switching fabric. Such queuing structures are well known in the art and will not be further discussed herein except to note that multiple forms of queuing structures are contemplated in all embodiments of the present invention. Accordingly, the present invention is not limited to any one form of queuing structure.

Figure 2:
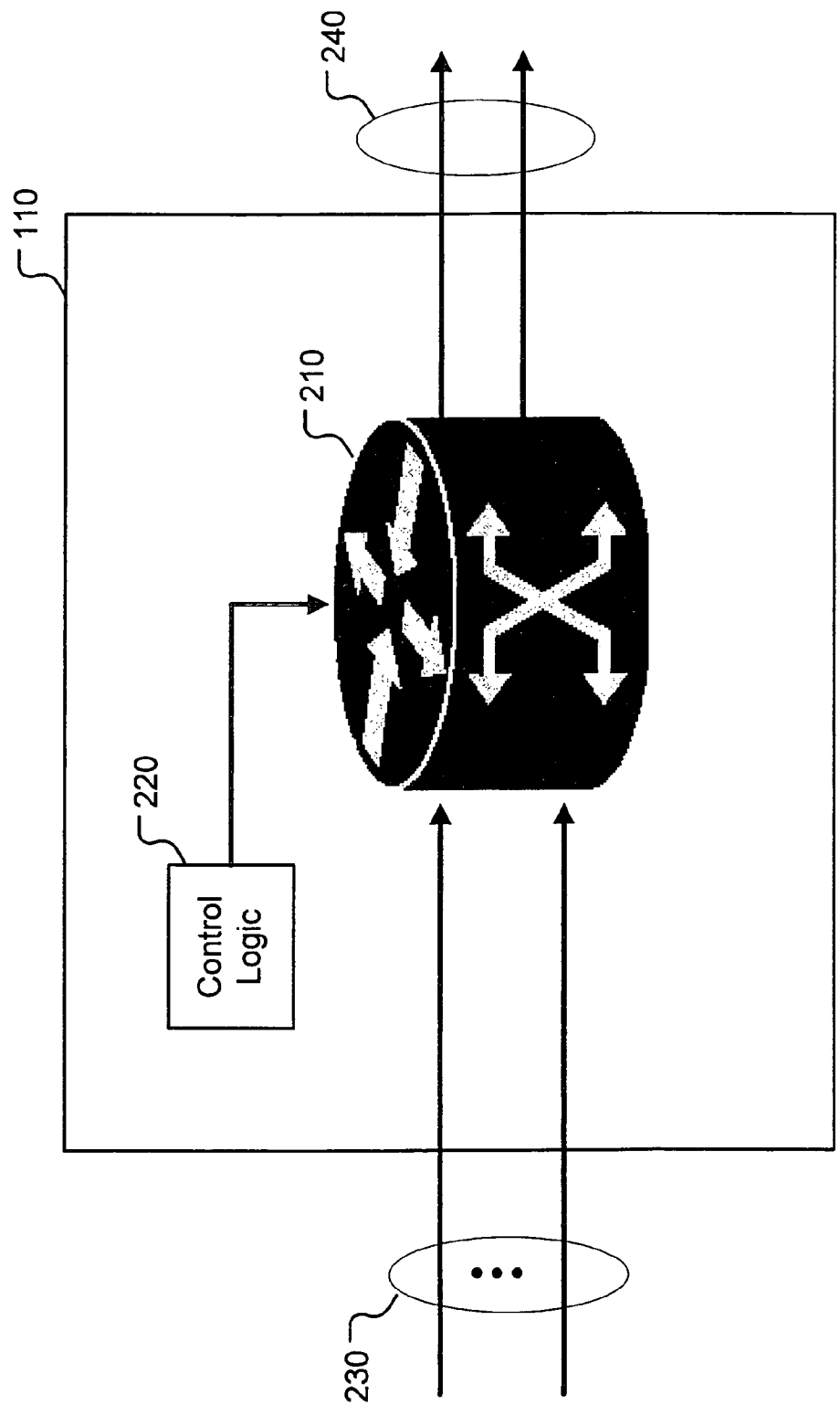
FIG. 2 is a high-level schematic of a prior art switch element 110.

FIG. 2 shows a switch element 110 of a prior art, multi-stage interconnection network. Prior art switch element 110 consists of conventional packet switching circuits 210 and control logic 220. Switching circuits 210 are commonly used in the art to route data packets arriving at one of ports 230 and routing them to one of outputs 240. This is essentially a one-to-one switching relationship where a packet arrives on an input port (or interface) and is switched to an output according to conventional control logic 220.

Figure 3:
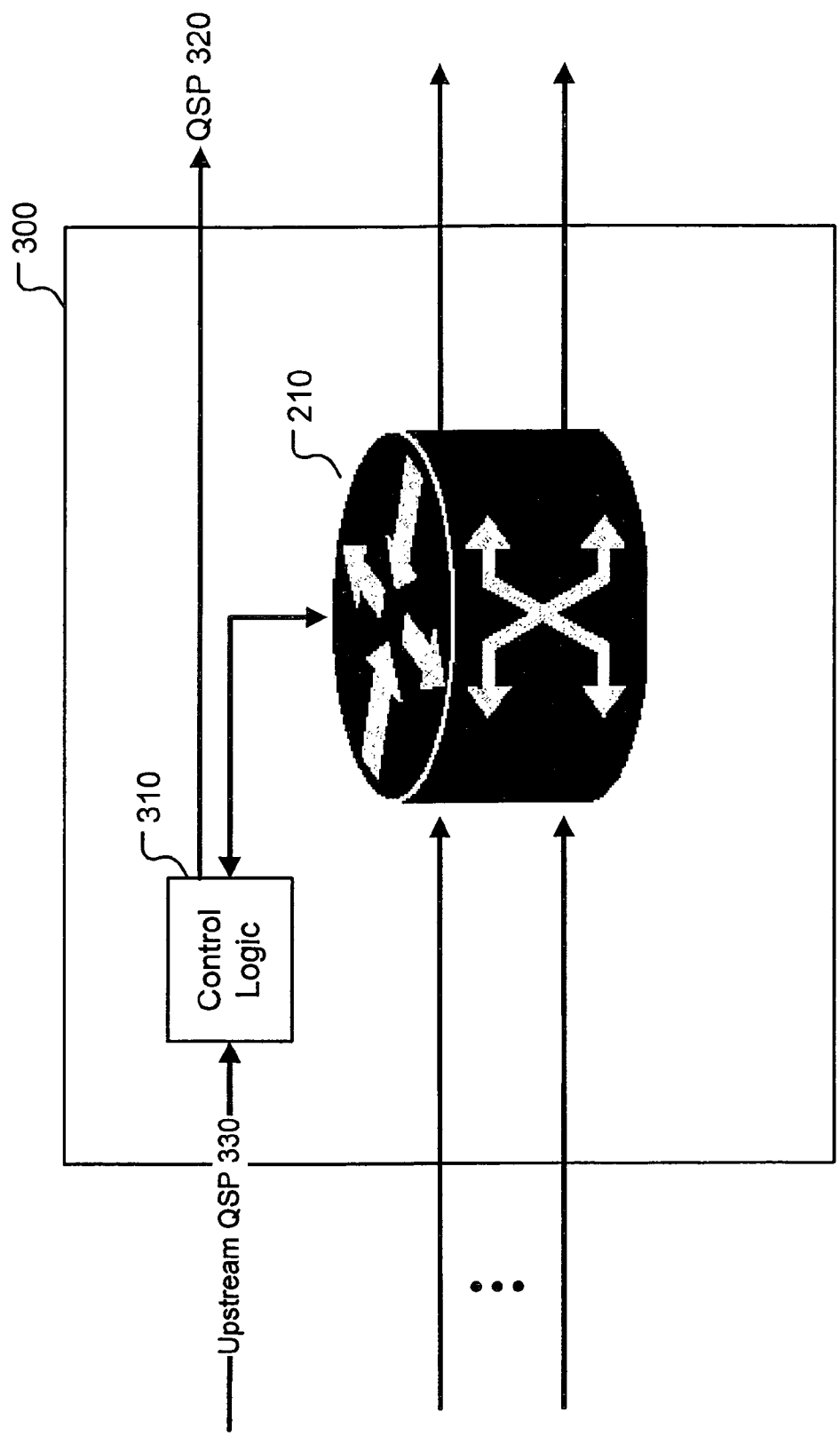
FIG. 3 is a high-level schematic of switch element 300 according to one embodiment of the present invention.

FIG. 3 shows switch element 300 according to one embodiment of the present invention. Here conventional switching circuits 210 are also present. However, otherwise conventional control logic 310 operates on a different algorithm and provides, among other things, queue status parameter (QSP) 320. In one embodiment of the present invention, switch element 300 is found in the last stage of MIN 100 only and its outputs are directly connected to the egress linecards 120, as shown in FIG. 1.

In an alternative embodiment of the present invention, multiple stages within MIN 100 are equipped with switch elements 300. In such an implementation, each QSP signal 320 is connected to control logic 310 of the downstream or following stage. This signal is shown as upstream QSP 330 in FIG. 3. Note that in the first embodiment discussed above, only the last stage of MIN 100 produces QSP signal 320. Accordingly, there is no upstream QSP signal 330 input in that embodiment.

Figure 8:
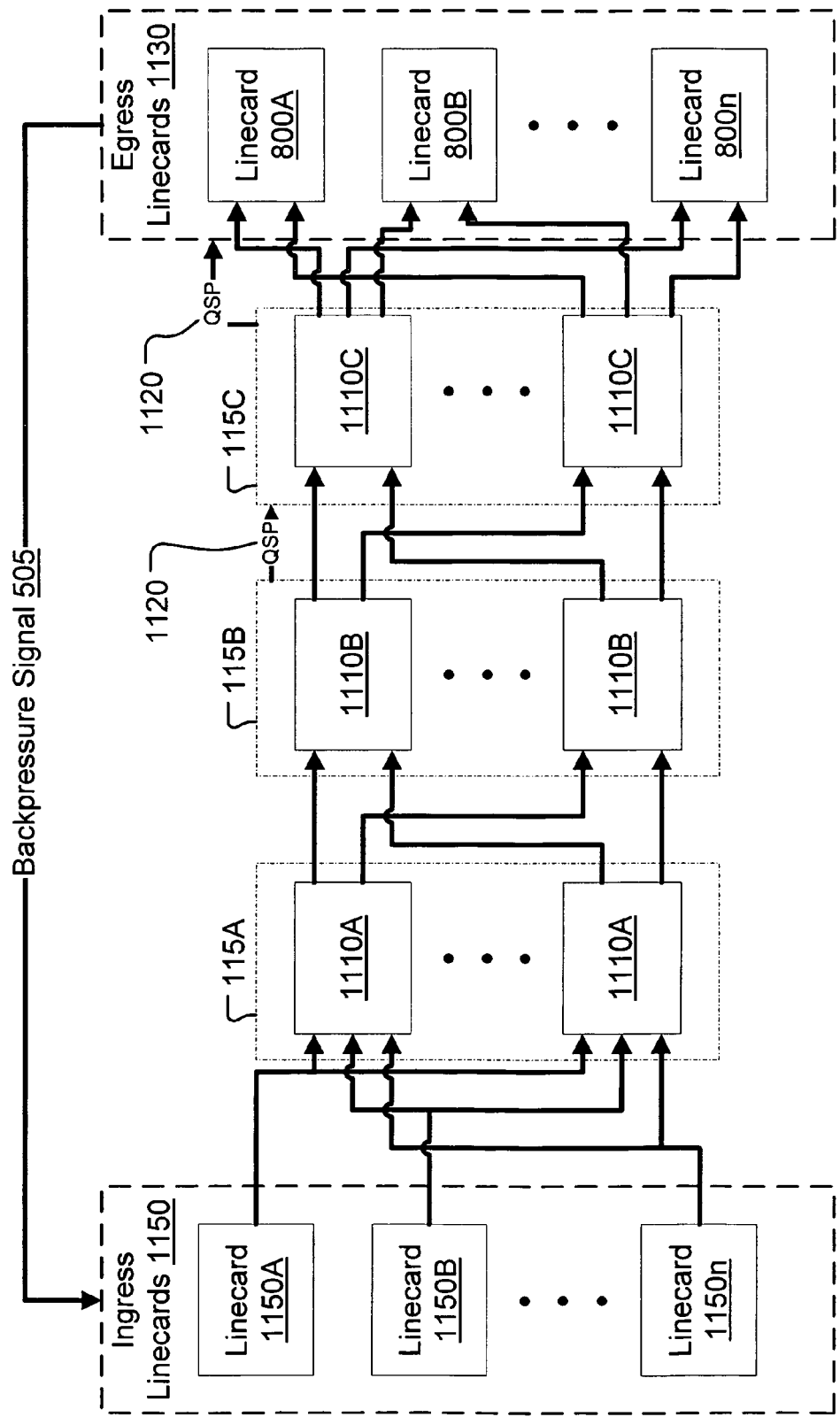
FIG. 8 is a high-level system block diagram of one embodiment of the present invention.

FIG. 8 shows a high-level schematic diagram of a switch according to one embodiment of the present invention. For ease of exposition, FIG. 8 can be thought of as representing an otherwise conventional Benes network. This is a three-stage MIN in which each first stage element 1110A distributes packets to second stage elements 1110B without regard to the intended destination of the packets. Each second stage element 1110B then forwards packets to that third stage element 1110C that serves the linecard for which the packet is destined. Each third stage element 1110C then forwards the packet to the appropriate egress linecard 800. However, one skilled in the art will readily appreciate that the concepts described are readily extended to MINs other than a Benes network.

Figure 9C:
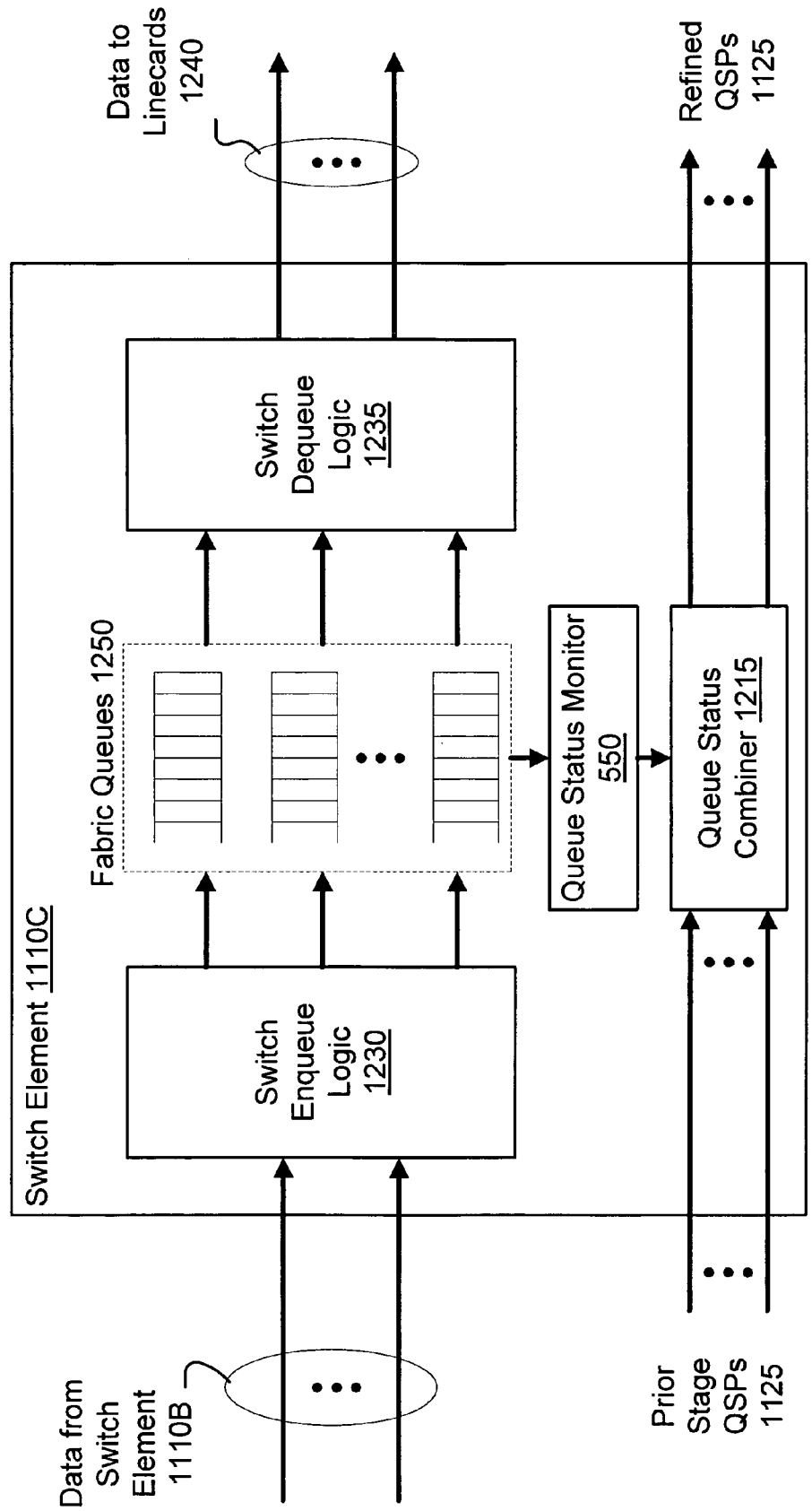
FIG. 9C is a high-level schematic of switch element 1110C according to one embodiment of the present invention.

Additional details are presented in high-level schematic diagrams in the following figures: FIG. 5 depicts an ingress linecard; FIGS. 9A, 9B, and 9C depict several fabric elements; and FIG. 6 depicts an egress linecard.

In FIG. 5, each packet arriving at one of the ingress ports 525 is examined by conventional packet classification logic 520 which chooses an ingress queue 515 to hold the packet.

Ingress queues 515 are serviced according to a schedule determined by queue selection control logic 510. Backpressure status table 540 records the backpressure signals (BPS) 505 as received from egress linecards and queue status monitor 550 maintains information such as the current lengths and fill rates of each ingress queue 515. Queue selection control logic 510 factors information from the backpressure status table 540 into its queuing decisions in order to reduce the rate at which backpressured packets are transmitted into the switch fabric. In some embodiments, queue selection control logic 510 also factors in information from queue status monitor 550.

The BPS may take on one of several values for each queue, reflecting the degree of backpressure (or throttling down) required by the system to reduce or avoid congestion. FIG. 7A shows a backpressure level diagram for a two-stage system, according to one embodiment of the present invention. Here, the backpressure signal is either "off" (not asserted) in region 1010, partly asserted in region 1020, or fully asserted in region 1030. The BPS is partly asserted when the rate at which packets are added to a particular queue should be decreased, but not cut off. As congestion increases, the BPS enters a "stop" mode, region 1030. Here, the backpressure signal is fully asserted in the case where no further packets are to be added to a particular queue.

Figure 7B:
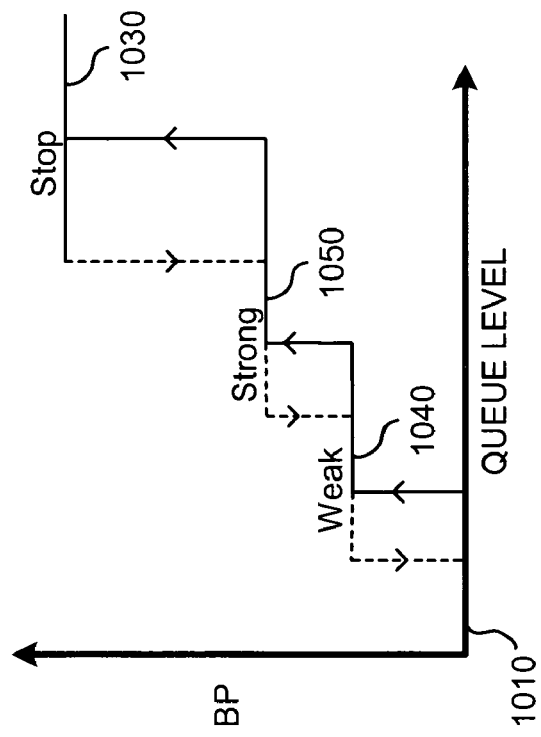
FIG. 7B is a backpressure level diagram showing a multi-stage backpressure system according to one embodiment of the present invention.
Figure 7A:
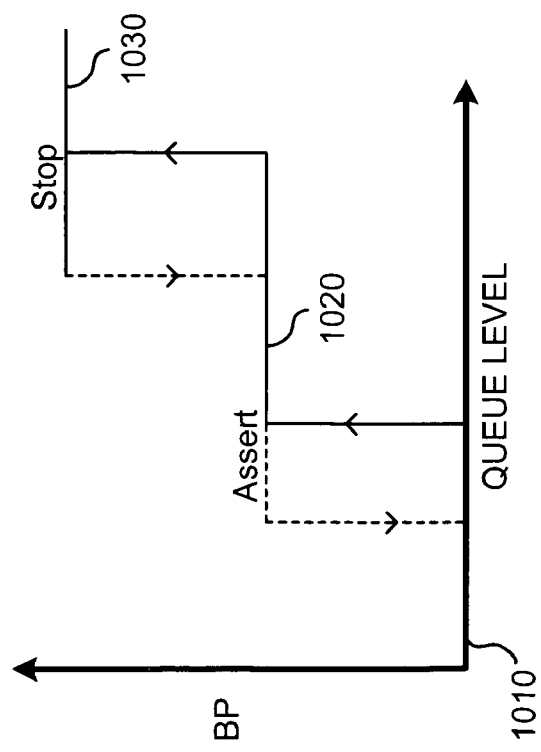
FIG. 7A is a backpressure level diagram showing a two-stage backpressure system according to one embodiment of the present invention.

In an alternate embodiment, a multi-level QSP as shown in FIG. 7B is implemented. Here, in region 1010, no backpressure is asserted. In region 1040 a weak backpressure signal is provided, indicating that the packet dequeue rate into the fabric should be limited, for example to one-half of the available bandwidth into the fabric. Alternatively, one out of every four (for example) packets could be dropped rather than enqueued.

In region 1050, a strong backpressure signal is asserted, indicating (again for example purposes only) that the packet dequeue rate should be further limited, for example to one-quarter of the available fabric bandwidth. Here also, in the alternative, three out of every four packets could be dropped instead of rate limiting the dequeue. In region 1030 backpressure is fully asserted (a "stop" condition) and no further packets are added to the queue.

Of course, a simple two-state ("off" and "stop") is also possible. Those skilled in the art will realize that multiple BPS states each with a different queue status threshold) can be used. Accordingly, the invention is not limited to any particular number of BPS states. Multiple thresholds allow recognition of different levels of congestion and therefore the ability to apply different backpressure signals.

Note that a hysteresis region is shown in FIGS. 7A and 7B at each BPS state transition. Such hysteresis provides protection from oscillating state transitions by preventing a BPS decrease from occurring too soon as the queue congestion level decreases.

Turning back to FIG. 5, when an ingress queue 515 is selected by queue selection control logic 510, a data packet is transmitted from the ingress linecard 1150 to the first stage in a multi-stage interconnection network 1110A as shown in FIG. 8.

The operation of switch elements 1110 is further described in FIGS. 9A, 9B, and 9C. In FIG. 9A, the packet is directed by a conventional packet distribution logic 1237 to one of the second stage elements 110B.

Referring now to FIG. 9B, when the packet reaches switch element 1110B, a conventional switching decision is made by switch enqueue logic 1230 and the packet is stored in a fabric queue 1250. Fabric queues 1250 are serviced by conventional switch dequeue logic 1235.

As packets arrive and leave fabric queues 1250, the queue status is measured by queue status monitor 550 in order to generate QSP 1125 for transmission to third-stage switch elements 1110C. Third-stage switch element 1110C is shown in FIG. 9C.

Queue status may be determined by measuring (e.g., as by counting) the number of possible queue elements occupied at a given time and comparing that measurement to the known capacity of the queue to compute a percentage fill value. Alternately, the rate at which the queue is being filled (i.e., the first derivative of the fill value over time) may be used as a status parameter. One of ordinary skill in the art would readily appreciate that many factors reflecting the degree to which a given queue is utilized exist. Accordingly, the present invention is not limited to any particular queue status parameter.

Queue status monitor 550 continuously monitors and updates the QSP for each queue. The following pseudocode calculates an average queue depth and an average fill rate for each ingress queue 515. These two averages are then combined to form a load parameter (called load) for the queue. Load is then compared with a table of backpressure states to determine the queue status parameter (QSP) for that queue. One of ordinary skill in the art will recognize that any of a variety of conventional circuits (including software and/or firmware) can be used to implement the function described by this pseudocode. Accordingly, queue status monitors 550 may be implemented in any number of different circuits and the present invention not limited to any single form of queue status monitor 550.

The averages are exponential weighted averages, with decay factors d_depth and d_fill, respectively. The combination uses a weight w_depth as the weight of the depth parameter and weight w_fill as the weight of the fill parameter. Note that various special cases arise by choosing extreme values of these parameters. For example, if d_depth is zero then the queue depth at any previous time is ignored and the current depth is used as the average depth of the queue. Similarly, if d_fill is zero the current fill rate is used as the average depth. If w_depth is zero, then the QSP is calculated solely on the basis of the fill rate. If w_fill is zero then QSP is calculated solely on the basis of the depth of the queue.

There are a number of ways to calculate QSP. Typically, such calculation involves both the current value of load and the most recently calculated QSP in order to introduce hysteresis in QSP calculations, as discussed earlier. However, it can equally well be calculated using the current value of load and the most recently calculated value of load.

For the purpose of illustration, QSP is represented as an integer ranging from zero (no backpressure) to N (maximum backpressure). QSP is calculated with reference to two arrays QSP_on and QSP_off. Both arrays are indexed from 1 to N. For each integer from 0 to N, a Boolean value QSP_n may be defined. QSP may then be defined as n, where n is the largest value for which QSP_n is true. If QSP_n is false for all n, then QSP is zero. For each n, QSP_n becomes true when the queue's load parameter exceeds QSP_on[n] and becomes false when load decreases below QSP_off[n]. Otherwise, it remains unchanged.

It will be clear that certain restrictions must be imposed on the arrays QSP_on and QSP_off. For example, the value of QSP_off[n] must be less than QSP_on[n], and the values of each array should increase as n increases.

One skilled in the art will recognize that there are many alternative methods for specifying QSP levels and calculating QSP values. Accordingly, this invention is not limited to any particular method of specification or calculation. For example, the QSP_on and QSP_off arrays could be replaced by linked lists. Or the QSP_off array could be omitted entirely and a single hysteresis parameter h specified, so that each QSP_off[n] value is effectively taken to be QSP_on[n]−h. Alternatively, the hysteresis parameter could be specified as a proportion of QSP_on[n] instead of as an absolute value.

```
previous_depth=0
previous_fill=0
previous_QSP=0 ('off')
forever
   wait until sample time elapsed
   measure current_depth
   average_depth=((1-d_depth)*current_depth)+
      (d_depth*previous_depth)
   fill_rate=current_depth-previous_depth
   average_fill=((1-d_fill)*current_fill)+
      (d_fill*previous_fill)
   load=(w_depth*average_depth)+
      (w_fill*average_fill)
   previous_depth=current_depth
   previous fill=current_fill
   for i=N downto i=1
      if (load>QSP_on[i])
         QSP=i
         Leave loop
      else if ((load   >=QSP_off[i])   &&
         (previous_QSP==i))
         QSP=i
         Leave loop
   Previous_QSP=QSP
```

Note that this pseudocode takes no account of priorities. If a high-priority queue is backpressured it may be desirable to backpressure all lower-priority traffic to the same destinations.

Referring now to FIG. 9C, when the packet reaches switch element 1110C a conventional switching decision is again made by switch enqueue logic 1230. The packet is stored in the appropriate fabric queue 1250, which is serviced according to conventional switch dequeue logic 1235.

Queue status is measured by queue status monitor 550. However, rather than being transmitted unchanged to the linecard, the QSP in this stage is now combined 110 with the prior stage QSP 1120 received from the prior-stage switch elements, in order to produce a refined QSP 1125. This combination is performed by queue status combination logic 1215, described in more detail below.

Referring now to FIG. 6, the packet is sent to its destination egress linecard 800 where conventional egress enqueue logic 850 chooses an egress queue 820 for it. Conventional queue service logic 860 controls dequeues from the egress queues 820. During operation, egress queues 820 are monitored by queue status monitor 550, which is similar or identical to the queue status monitors 550 in other switch elements.

The stage 3 QSP 805 is combined with the status information produced by queue status monitor 550 in queue status combination logic 880 to produce queue backpressure signal (BPS) 505. It is this backpressure signal 505 that is communicated upstream, i.e., backward through the MIN, to the ingress linecards in FIG. 5.

Upstream communication of the BPS from the egress linecards to the ingress linecards is provided, in one embodiment of the present invention, by a conventional control cell or message which is sent through the MIN from the egress linecards to all ingress linecards. This signaling method (utilizing a control packet) is generally referred to as in-band signaling. In other embodiments of the present invention, a separate out-of-band channel may be used. Such an out-of-band channel consists of a separate dedicated line or lines for carrying the backpressure signal. The backpressure signal may be expressed as either a multi-state analog signal (e.g., two or more voltage states representing backpressure on asserted or off) or a multi-bit serial or parallel digital message representing the type or magnitude of backpressure signal.

Although an explicit in-band, upstream path is described, those skilled in the art will realize that other upstream paths from the egress linecard to the ingress linecard are known in the switching/routing arts. Accordingly, the invention is not limited to any particular type of upstream path.

The queue status combination logic 880 performs the following function: Each local QSP signal calculated by queue status monitor 550 is assigned a numerical value, with zero assigned to the "off" (no congestion) level and larger values assigned to the higher levels of congestion. In this way, a numerical congestion level is effectively assigned to each egress queue 820. A similar numerical value is assigned to the last stage QSP 805, thus assigning a numerical congestion level to each stage 3 fabric queue. The numerical value for each local (egress) queue is then added to the numerical value for the stage 3 fabric queue that feeds into the local queue. The resulting sum is compared to a threshold level to determine the BPS 505 for the egress queue.

In one embodiment, the operator sets the threshold at system initialization. Alternatively, the threshold may be computed adaptively with an initial minimum level that is raised if necessary so as to limit the number of egress queues that are backpressured (and thus limit the amount of backpressure traffic). The comparison can be performed by a number of conventional means, including but not limited to those using combinational logic with one or more QSP signals as inputs and supplying BPS 505 as the output.

While queue status monitor 505 is impliedly the same circuit (including software/firmware in some embodiments) in ingress linecard 1150, second stage switch element 110B (FIG. 9B), third stage switch element 110C (FIG. 9C), and egress linecard 800 (FIG. 6), one of ordinary skill in the art will recognize that these circuits are not necessarily identical as long as they provide the same function. The circuits may be varied or optimized to the particular constraints of the linecards 1150 and 1130 and switch elements 1110. Accordingly, the circuitry of queue status monitor 550 is not limited in its configuration.

Process Flow

FIG. 4A shows a flowchart of the queue congestion control method according to one embodiment of the present invention. Process 400 begins with the reception of a packet in an ingress linecard, step 405. The packet is enqueued in the ingress linecard in step 410.

In some embodiments (discussed above with respect to a representative circuit/system embodiment), the status of each ingress linecard local queue is measured to generate a local queue status parameter (QSP) for each queue, step 413. The local QSP is then combined in step 415 with a backpressure signal (BPS) for each queue in step 415.

At step 420, the backpressure signal is applied to all affected queues, i.e., the specific BPS for each queue is factored into the next queuing decision for that queue since the backpressure signal contains backpressure information for each egress linecard queue. These queues are represented in the ingress linecard by either ingress queues corresponding one-to-one or by the packet information used to place (enqueue) individual packets in a given egress queue. In the former case, the BPS component for each egress queue is applied directly. In the latter case, the BPS is used to affect the switching decision prior to enqueuing.

The result of applying the BPS is tested in step 419. If the BPS is such that the packet dequeue rate is decreased or a "stop" is asserted (i.e., the packet is dropped or temporarily stored in the ingress linecard), the process starts to work on the next packet (step 405) until fabric congestion clears. Otherwise, if there is no backpressure or only partial backpressure, the packet is dequeued to the first stage, step 425.

The packet is dequeued from the ingress linecard and passed to the first stage in a multi-stage interconnection network at step 425. A conventional packet switching decision is made in the first stage and the packet is enqueued (step 430) in the queue structure local to the first stage to await transmission to the succeeding (next) MIN stage.

Steps 425 and 430 are carried out for each packet in each MIN stage as the packet transits the MIN, regardless of the number of stages in the MIN. Finally, in step 435, the packet is dequeued into the last stage of the MIN. A conventional switching decision to determine the particular egress linecard destination is made and the packet is enqueued in a queuing structure local to the last stage in step 440.

Local queue status is measured in step 450 to generate a QSP for the last stage. QSP signals are sent to the egress linecard, step 452, as is the stream of packets. Packets are dequeued in step 455. The conventional packet switching decision is again made in the egress linecard and the packet is enqueued in the appropriate egress (output) queue, step 457. At this time the egress linecard measures its own queue status, step 460, to generate an egress QSP for each queue. In step 465, the egress QSP is combined with the last stage (local) QSP to generate the backpressure signal corresponding to the packet's egress linecard queue on a per-egress queue basis. It is this backpressure signal that is communicated upstream, i.e., backward through the MIN to the ingress linecard in step 470.

This backpressure signal is combined, in one embodiment, with the ingress linecard QSP in step 415, as described above. In an alternate embodiment of the present invention, steps 413 and 415 of measuring the ingress linecard QSP and combining that with the backpressure signal are omitted and the BPS signal is applied to the packet stream directly, step 420.

The combining step 465 (and where present, step 415) consists of adding the last stage local QSP to the egress linecard QSP and comparing the sum to a threshold level. Alternatively, combining step 465 can comprise (in addition to or instead of adding) performing a table lookup using either or both QSP values or another calculation on the QSP values.

Figure 4B:
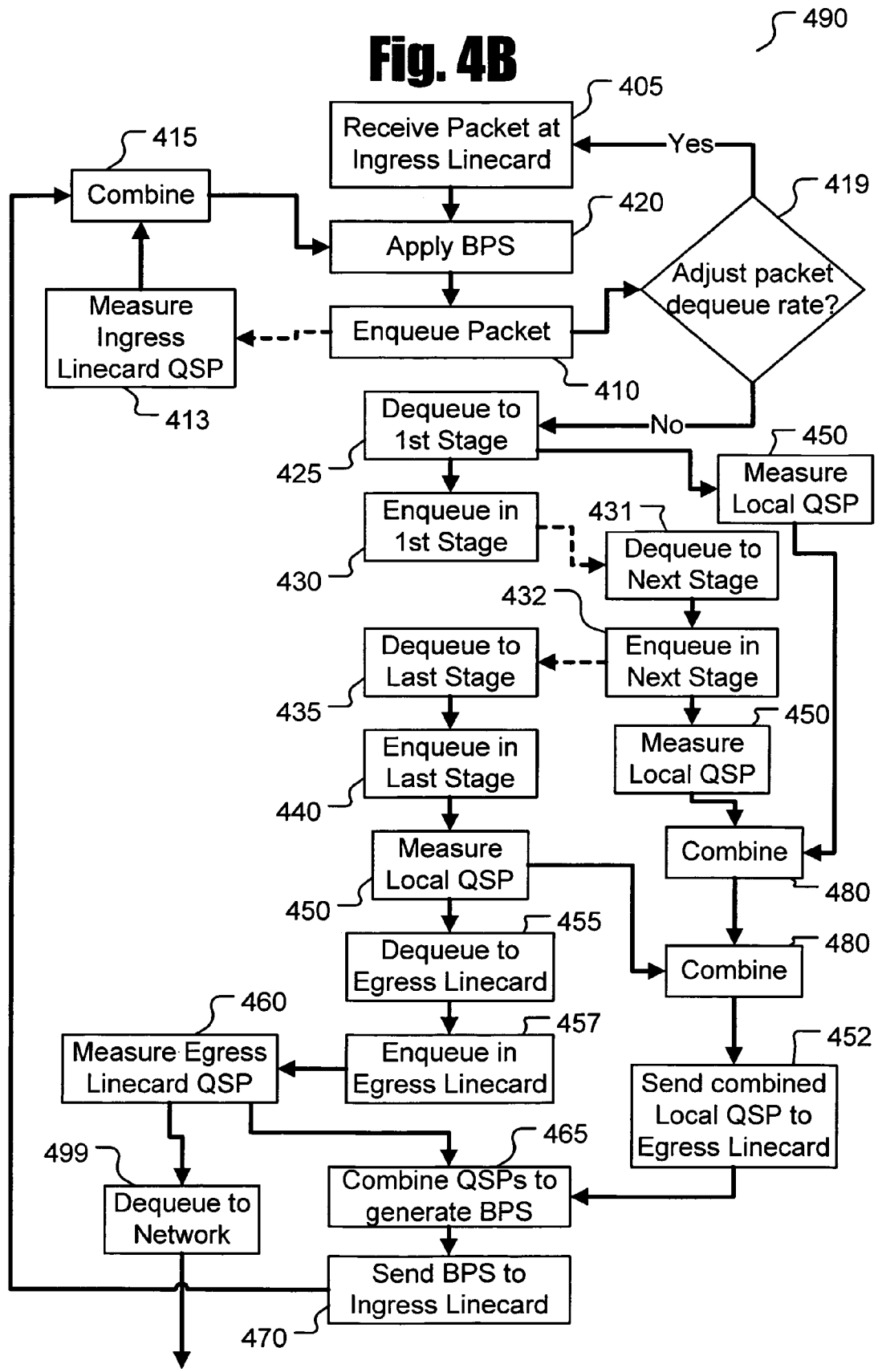
FIG. 4B is a flowchart of the selective backpressure control method according to an alternate embodiment of the present invention.

FIG. 4B describes an alternate embodiment of the present invention featuring QSP measurement in multiple MIN stages. The procedure begins as in FIG. 4A, steps 405 through 430, by enqueuing the package in the first stage. Here, however, step 450 measures the local (first stage) QSP immediately after step 430. In step 431, the packet is dequeued from the first stage to the next stage as above.

In step 432 the packet is enqueued in the next stage. Again however, step 450 measures the next stage local QSP and then, in a new step 480, the first stage QSP is combined with the next stage's local QSP. This process continues for each stage until the last stage wherein the process proceeds as in FIG. 4A.

After the local QSP is measured for the last stage, step 450, the last stage local QSP is combined with the penultimate stage QSP in step 480. The combined QSP is passed downstream to the egress linecard for combining with the egress queue status parameters and generation of the backpressure signal as in FIG. 4A.

The alternate embodiment of FIG. 4B may be utilized in every stage of the MIN or a subset of the stages in the MIN. As can be seen by the foregoing disclosure, the process of continuously measuring the local queue status parameter in a given stage after enqueuing of a new packet is easily scalable to one or more stages. The cascading combination of QSPs (step 480) is entirely analogous to the combination (in step 465) of the last stage QSP and the egress linecard local QSP. Furthermore, QSP signals may be broadcast to all elements of the MIN or may, as shown in FIG. 8, be sent from one stage to the next stage only in cascading fashion.

Queuing Structures

Queuing structures 820 within the egress linecard (referring to FIG. 6) are, in some embodiments of the present invention, organized according to the well-known class of service of each packet. Separate queues are maintained for each different class of service handled by the switch. Such queues may then be read and dequeued at different rates depending on the class of service assigned to each queue. The present invention is equally applicable to switching devices using class of service-oriented queuing and to devices that enqueue packets without regard to class of service. Each queue, regardless of queue organization, has its status measured at one or more switch elements and in the egress linecard (and, in some embodiments, in the ingress linecard) and a unique backpressure signal is created for each egress queue. This egress queue oriented backpressure signal is the signal that is communicated upstream to the ingress linecard and used in the very first switching decision to decide whether or not a packet will even be transmitted across the MIN.

If a packet arriving in the ingress linecard is of a class of service or is otherwise identifiable as destined for an egress linecard queue that is congested, the queue status parameter for that congested queue can be used to imply a packet drop probability. In other words, if a packet received in the ingress linecard is destined for a highly congested queue, that queue will be represented at the ingress linecard by a high-level backpressure signal (e.g. "strong backpressure" or "stop"). The control logic of the ingress linecard will interpret a high level backpressure signal as increasing the probability that the control circuit will drop that packet prior to sending it into the MIN. For example, if egress linecard queue 21 is completely congested such that a 100% backpressure signal is generated, i.e., "stop" level 1030 (referring to FIG. 7), then the BPS will be interpreted by ingress linecard control logic as a 100% drop indicator. Thus, a new packet arriving at the ingress linecard destined for congested queue 21 will be dropped immediately and not passed into the MIN.

In general the ingress linecard, being the only component of the switching device authorized to pass or drop packets, will make the decision guided by or determined by backpressure signal as to whether a packet will continue onward through the switching device.

Alternate Embodiments

In an alternate embodiment of the present invention, ingress linecard queue selection control logic 510 includes a finite state machine that uses the ingress linecard's local QSP (from queue status monitor 550) along with the backpressure signal (via backpressure status table 540) from the egress linecard to generate the queuing control throttle signal.

The order in which the steps of the methods of the present invention are performed is purely illustrative in nature. In fact, the steps of methods can be performed in any order or in parallel, unless otherwise indicated by the present disclosure.

The methods of the present invention may be performed in hardware, software, or any combination thereof, as those terms are currently known in the art. In particular, the present methods may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

We claim:

1. A method of queue congestion control in a multi-stage switch, said multi-stage switch comprising at least one ingress linecard, a plurality of switch elements arranged from a first switch element to a last switch element, and at least one egress linecard, said method comprising:
   enqueuing a first data packet in an inbound queue in said ingress linecard;
   dequeuing said first data packet to said first switch element;
   enqueuing said first data packet in a first switch element queue in said first switch element;
   dequeuing said first data packet to said last switch element;
   enqueuing said first data packet in a last switch element queue in said last switch element, wherein said enqueuing comprises determining a last queue status parameter (QSP);
   dequeuing said first data packet to said egress linecard, said dequeuing further comprising communicating said last QSP to said egress linecard;
   enqueuing said first data packet in an output queue, said output queue having an output queue status;
   periodically combining said output queue status with said last QSP, forming a backpressure signal;
   communicating said backpressure signal to said ingress linecard; and
   selectively enqueuing a second data packet in said inbound queue in said ingress linecard, wherein said enqueuing is influenced at least in part by said backpressure signal.

2. The method of claim 1, wherein said selective enqueuing further comprises:
   determining an input queue status of said inbound queue; and
   combining said input queue status with said backpressure signal to determine said selectively enqueuing.

3. The method of claim 1, wherein said last switch element queue comprises a plurality of queue elements and said QSP is based on a number of said queue elements in use in said queue.

4. The method of claim 1, wherein said last switch element queue comprises a plurality of queue elements and said QSP is based on a fill rate of said plurality of queue elements.

5. The method of claim 1, wherein said backpressure signal has more than two discrete states.

6. The method of claim 1, wherein said communicating said backpressure signal uses in-band signaling.

7. The method of claim 1, wherein said communicating said backpressure signal uses out-of-band signaling.

8. The method of claim 1, wherein for a plurality of switch elements:
   each said enqueuing in a switch element queue comprises determining a local QSP and combining said local QSP with a prior QSP communicated from a prior switch element to form a new QSP;
   each said dequeuing to a next said switch element further comprises communicating said new QSP to said next switch element.

9. The method of claim 8, wherein said plurality of switch elements comprises all said switch elements in said multi-stage switch.

10. The method of claim 8, wherein the switch element queue comprises a plurality of queue elements and said determining a local QSP is based on a number of said queue elements in use in said queue.

11. The method of claim 8, wherein the switch element queue comprises a plurality of queue elements and said determining a local QSP is based on a fill rate of said plurality of queue elements.

12. An apparatus for controlling queue congestion in a multi-stage switch, said multi-stage switch comprising at least one ingress linecard, a plurality of switch elements arranged from a first switch element to a last switch element, and at least one egress linecard, comprising:

an ingress linecard comprising circuitry to selectively enqueue a data packet in an inbound queue;

said first switch element, into which said ingress linecard dequeues said data packet, comprising circuitry to enqueue said data packet in a first switch element queue;

said last switch element, into which an upstream switch element dequeues said data packet, comprising circuitry to enqueue said data packet in a last switch element queue and determine a last queue status parameter (QSP); and an egress linecard, into which said last switch element dequeues said data
packet and communicates said last QSP, comprising:
circuitry to enqueue said data packet in an output queue, said output queue having an output queue status;
circuitry to combine said output queue status with said last QSP to periodically form a backpressure signal; and
circuitry to communicate said backpressure signal to said ingress linecard, wherein said circuitry to selectively enqueue said data packet in said ingress linecard is influenced at least in part by said backpressure signal.

13. The apparatus of claim 12, wherein said circuitry to selectively enqueue said data packet further comprises:
circuitry to determine an input queue status; and
circuitry to combine said input queue status with said backpressure signal to influence said circuitry to selectively enqueue said data packet.

14. The apparatus of claim 13, wherein said circuitry to combine said input queue status with said backpressure signal further comprises a state machine.

15. The apparatus of claim 12, wherein said last switch element queue comprises a plurality of queue elements and said QSP is based on a number of said queue elements in use in said queue.

16. The apparatus of claim 12, wherein each said last switch element queue comprises a plurality of queue elements and said QSP is based on a fill rate of said plurality of queue elements.

17. The apparatus of claim 12, wherein said backpressure signal has more than two discrete states.

18. The apparatus of claim 12, wherein said circuitry to communicate said backpressure signal uses in-band signaling.

19. The apparatus of claim 12, wherein said circuitry to communicate said backpressure signal uses out-of-band signaling.

20. The apparatus of claim 12, having a plurality of switch elements, each of said plurality of switch elements comprising:
circuitry to enqueue said data packet in a corresponding switch element queue;
circuitry to determine a local QSP;
circuitry to combine said local QSP with a prior QSP communicated from a prior switch element to form a new QSP; and
circuitry to communicate said new QSP to a next switch element.

21. The apparatus of claim 20, wherein said plurality of switch elements comprises all said switch elements in said multi-stage switch.

22. The apparatus of claim 20, wherein the switch element queue comprises a plurality of queue elements and said local QSP is determined based on a number of said queue elements in use in said queue.

23. The apparatus of claim 20, wherein the switch element queue comprises a plurality of queue elements and said local QSP is determined based on a fill rate of said plurality of queue elements.

24. The apparatus of claim 20, wherein said circuitry to combine said local QSP with a prior QSP further comprises a state machine.

25. An apparatus for controlling queue congestion in a multi-stage switch, said multi-stage switch comprising at least one ingress linecard, a plurality of switch elements arranged from a first switch element to a last switch element, and at least one egress linecard, comprising:

an ingress linecard comprising means for selectively enqueuing a data packet in an inbound queue;

said first switch element, into which said ingress linecard dequeues said data packet, comprising means for enqueuing said data packet in a first switch element queue;

said last switch element, into which an upstream switch element dequeues said data packet, comprising means for enqueuing said data packet in a last switch element queue and determine a last queue status parameter (QSP); and an egress linecard, into which said last switch element dequeues said data packet and communicates said last QSP, comprising:
means for enqueuing said data packet in an output queue, said output queue having an output queue status;
means for combining said output queue status with said last QSP to periodically form a backpressure signal; and
means for communicating said backpressure signal to said ingress linecard, wherein said circuitry to selectively enqueue said data packet in said ingress linecard is influenced at least in part by said backpressure signal.

26. A computer system for queue congestion control in a multi-stage switch, said multi-stage switch comprising at least one ingress linecard, a plurality of switch elements arranged from a first switch element to a last switch element, and at least one egress linecard; said computer system comprising computer instructions for:

selectively enqueuing a data packet in an inbound queue in said ingress linecard;

dequeuing said data packet to said first switch element;

enqueuing said data packet in a first switch element queue in said first switch element;

dequeuing said data packet to said last switch element;

enqueuing said data packet in a last switch element queue in said last switch element, wherein said enqueuing comprises determining a last queue status parameter (QSP);

dequeuing said data packet to said egress linecard, said dequeuing further comprising communicating said last QSP to said egress linecard;

enqueuing said data packet in an output queue, said output queue having an output queue status;

wherein said instructions periodically combine said output queue status with said last QSP, forming a backpressure signal.

27. A computer-readable storage medium, comprising computer instructions for queue congestion control in a multi-stage switch, said multi-stage switch comprising at least one ingress linecard, a plurality of switch elements arranged from a first switch element to a last switch element, and at least one egress linecard; said computer instructions comprising:

selectively enqueuing a data packet in an inbound queue in said ingress linecard;

dequeuing said data packet to said first switch element;

enqueuing said data packet in a first switch element queue in said first switch element;

dequeuing said data packet to said last switch element;

enqueuing said data packet in a last switch element queue in said last switch element, wherein said enqueuing comprises determining a last queue status parameter (QSP);

dequeuing said data packet to said egress linecard, said dequeuing further comprising communicating said last QSP to said egress linecard;

enqueuing said data packet in an output queue, said output queue having an output queue status;

wherein said instructions periodically combine said output queue status with said last QSP, forming a backpressure signal.

28. A computer data signal embodied in a carrier wave, comprising computer instructions for queue congestion control in a multi-stage switch, said multi-stage switch comprising at least one ingress linecard, a plurality of switch elements arranged from a first switch element to a last switch element, and at least one egress linecard; said computer instructions comprising:

selectively enqueuing a data packet in an inbound queue in said ingress linecard;

dequeuing said data packet to said first switch element;

enqueuing said data packet in a first switch element queue in said first switch element;

dequeuing said data packet to said last switch element;

enqueuing said data packet in a last switch element queue in said last switch element, wherein said enqueuing comprises determining a last queue status parameter (QSP);

dequeuing said data packet to said egress linecard, said dequeuing further comprising communicating said last QSP to said egress linecard;

enqueuing said data packet in an output queue, said output queue having an output queue status;

wherein said instructions periodically combine said output queue status with said last QSP, forming a backpressure signal.

* * * * *